(12) United States Patent
Tamaoki et al.

(10) Patent No.: US 8,455,791 B2
(45) Date of Patent: Jun. 4, 2013

(54) LASER PROCESSING METHOD, LASER PROCESSING DEVICE AND CABLE HARNESS PRODUCTION METHOD

(75) Inventors: Shinobu Tamaoki, Yokohama (JP); Motoki Kakui, Yokohama (JP); Kazuo Nakamae, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 960 days.

(21) Appl. No.: 12/397,490

(22) Filed: Mar. 4, 2009

(65) Prior Publication Data

US 2009/0223943 A1    Sep. 10, 2009

(30) Foreign Application Priority Data

Mar. 4, 2008   (JP) ................. P2008-053710

(51) Int. Cl.
*B23K 26/00* (2006.01)
(52) U.S. Cl.
USPC ........... 219/121.69; 219/121.67; 219/121.68; 219/121.8; 219/121.81; 219/121.82; 219/121.83
(58) Field of Classification Search
USPC ........... 219/121.67–121.69, 121.8–121.83
See application file for complete search history.

(56) References Cited

U.S. PATENT DOCUMENTS

| | | | | |
|---|---|---|---|---|
| 3,469,065 A * | 9/1969 | Scheffels et al. | ........ | 219/121.19 |
| 4,263,495 A * | 4/1981 | Fujita et al. | ........... | 219/121.64 |
| 4,350,867 A * | 9/1982 | Kinoshita et al. | ........ | 219/121.63 |
| 4,498,917 A * | 2/1985 | Weinstein et al. | ........... | 65/382 |
| 4,547,650 A * | 10/1985 | Arditty et al. | ............ | 219/121.65 |
| 5,127,062 A * | 6/1992 | Cerda | ............. | 382/100 |
| 5,161,207 A * | 11/1992 | Pikulski | ............. | 385/96 |
| 5,339,380 A * | 8/1994 | Wysocki et al. | ............. | 385/136 |
| 5,570,446 A * | 10/1996 | Zheng et al. | ............. | 385/98 |
| 5,827,391 A * | 10/1998 | Carriere et al. | ........... | 156/272.8 |
| 5,946,798 A * | 9/1999 | Buluschek | ........ | 29/828 |
| 6,063,701 A * | 5/2000 | Kuwazaki et al. | ........... | 438/616 |
| 6,072,148 A * | 6/2000 | Azdasht | ............. | 219/121.63 |
| 6,676,878 B2 * | 1/2004 | O'Brien et al. | ............. | 264/400 |
| 7,045,739 B2 * | 5/2006 | Dietrich | ............. | 219/121.69 |

(Continued)

FOREIGN PATENT DOCUMENTS

| | | |
|---|---|---|
| JP | 63-249413 A | 10/1988 |
| JP | 64-071584 A | 3/1989 |

(Continued)

*Primary Examiner* — Henry Yuen
*Assistant Examiner* — Brett Spurlock
(74) *Attorney, Agent, or Firm* — Venable LLP; Michael A. Sartori; Tamatane J. Aga (57) ABSTRACT

The present invention relates to a laser processing method and the like provided with a structure for enabling realization of both preferable processing of locations not easily reached by laser light and effective inhibition of damage caused to locations easily reached by laser light during laser processing. Radiation optics scan locations irradiated with laser light from a laser light source while radiating laser light onto a plurality of objects arranged on a stage and the periphery thereof from a direction perpendicular to the stage. On the stage reflecting members are respectively arranged adjacent to the plurality of objects. The reflecting members reflect laser light radiated from the radiation optics towards lateral surfaces of the objects. Since laser light reflected by the reflecting members is radiated onto the lateral surfaces of the objects, laser light also reaches the lateral surfaces of the objects not easily reached by laser light without having to increase the intensity of the laser light.

7 Claims, 8 Drawing Sheets

U.S. PATENT DOCUMENTS

| | | | |
|---|---|---|---|
| 7,157,038 B2* | 1/2007 | Baird et al. | 264/400 |
| 7,166,186 B2* | 1/2007 | Lowry | 156/345.5 |
| 7,241,993 B2* | 7/2007 | Nakasuji et al. | 250/310 |
| 2002/0028399 A1* | 3/2002 | Nakasuji et al. | 430/30 |
| 2003/0169522 A1* | 9/2003 | Schofield et al. | 359/876 |
| 2006/0091126 A1* | 5/2006 | Baird et al. | 219/121.72 |
| 2007/0241086 A1* | 10/2007 | Arao et al. | 219/121.84 |

FOREIGN PATENT DOCUMENTS

| | | | |
|---|---|---|---|
| JP | 06-055281 | | 3/1994 |
| JP | 08-090273 A | | 4/1996 |
| JP | 08-186918 A | | 7/1996 |
| JP | 2003-002677 A | | 1/2003 |
| JP | 2005-211908 A | | 8/2005 |
| JP | 2006210299 A | * | 8/2006 |
| JP | 2007-290013 A | | 11/2007 |

* cited by examiner

LASER PROCESSING METHOD, LASER PROCESSING DEVICE AND CABLE HARNESS PRODUCTION METHOD

BACKGROUND OF THE INVENTION

1. Field of the Invention

The present invention relates to a laser processing method, a laser processing device and a cable harness production method.

2. Related Background Art

Processing technology using laser light is widely used in various fields such as processing and health care. An example of processing using laser light consists of the processing of a cable harness in which shielded copper wire cables are arranged in a row.

Removal of the shielding provided around the cable is important when carrying out processing using laser light on articles in which cables are arranged in a row in the manner of cable harnesses. In the case this removal of the shielding cannot be carried out satisfactorily, problems such as defective contact may occur. However, there is the problem of being unable to adequately remove shielding as a result of shielding on the lateral surfaces of cables arranged between adjacent cables in particular being unable to be adequately irradiated with laser light. Consequently, various studies have been conducted on processing of the lateral surfaces of cable, and processing methods have been disclosed in the manner of that indicated in, for example, Japanese Patent Application Laid-open No. H06-055281 (Document 1).

SUMMARY OF THE INVENTION

The present inventors have examined the above prior art, and as a result, have discovered the following problems.

That is, it is necessary to radiate laser light of sufficient intensity onto the shielding of lateral surfaces of cables in order to adequately remove that shielding by laser processing. However, in the case of radiating laser light of an intensity that enables shielding of lateral surfaces to be adequately removed at locations easily reached by the laser light, it not only severs the shielding but also causes damage to the inside of the cable. In this manner, in order to adequately carry out laser processing on an object having both locations easily reached by laser light and locations not easily reached by laser light, it is necessary to change the intensity of the laser light radiated onto the object. However, in order to carry out laser processing on an object in the manner of a cable harness by changing laser light intensity by mechanical or optical control, a control mechanism and laser power control mechanism capable of high-speed position detection are required, thus resulting in the problem of requiring an extremely expensive system.

The present invention has been developed to eliminate the problems described above. It is an object of the present invention to provide a laser processing method provided with a structure for realizing both processing of locations not easily reached by laser light and effective inhibition of the occurrence of damage at locations easily reached by laser light, a laser processing device, and a cable harness production method.

In order to achieve the above object, the laser processing method according to the present invention comprises scanning laser light radiated from a laser light source over a plurality of objects arranged in an array on a flat processing stage (hereinafter referred to as laser-processing stage) and over irradiated locations in the periphery thereof using radiation optics while radiating from a direction perpendicular to the installation surface, and irradiating lateral surfaces of the objects by reflecting laser light radiated by the radiation optics with reflecting members provided on the laser-processing stage adjacent to each of the plurality of objects.

Laser processing can be preferably carried out since laser light can be adequately radiated onto lateral surfaces of the objects not easily reached by laser light by radiating laser light onto reflecting members adjacent to each of the plurality of objects and irradiating the lateral surfaces of the objects with laser light reflected with the reflecting members. In addition, laser processing can be carried out without causing damage to the upper surface of the objects since irradiation of the upper surface of the objects easily reached by the laser light with high intensity laser light can be avoided by changing the intensity of the laser light for processing the lateral surfaces of the objects.

In addition, in a preferable aspect of the laser processing method according to the present invention, the surface of the laser-processing stage excluding the reflecting members is composed of a member having low reflectance with respect to laser light. In addition, in another preferable aspect thereof, the surface of the laser-processing stage excluding the reflecting members may be composed of a substance that absorbs laser light or is permeable thereto.

As a result of employing an aspect as described above for the surface of the laser-processing stage excluding the reflecting members, the entry of laser light that has reached the surface of the laser-processing stage excluding the reflecting members into the radiation optics or laser light source as a result of being reflected by the laser-processing stage can be prevented.

The laser processing method according to the present invention can also adopt an aspect in which laser light is irradiated onto lateral surfaces of the objects from a direction parallel to the laser-processing stage by reflecting the laser light with reflecting members located at the same height as the lateral surfaces of the objects.

As a result of irradiating the lateral surfaces of the objects from a direction parallel to the laser-processing stage as described above, laser light can be radiated onto the lateral surfaces of the objects from a direction more easily reached by the laser light. Thus, laser processing of lateral surfaces of the objects is carried out more preferably.

In addition, the laser processing method according to the present invention can also adopt an aspect in which the height of the reflecting members can be changed by a height adjustment unit.

As a result of changing the height of the reflecting members, laser light reflected by the reflecting members is able to more preferably irradiate the lateral surfaces of the objects. Thus, laser processing of the lateral surfaces of the objects can be carried out more efficiently.

The laser processing method according to the present invention can also adopt an aspect in which changing the height of the reflecting members is carried out after the height adjustment unit has received a control signal emitted by an object inverting unit when inverting the objects following completion of processing of one side of the objects but prior to the start of processing of the other side of the objects by inverting the objects with the object inverting unit.

As a result of changing the height of the reflecting members after the height adjustment unit has received a control signal emitted by the object inverting unit when inverting the objects, the lateral surfaces of the objects can be preferably processed by the reflecting members following adjustment of height during laser processing of objects after they have been inverted, thereby allowing the upper and lateral surfaces of the objects to be processed efficiently.

In addition, an aspect may also be employed in which a gas on the surface of the laser-processing stage is suctioned through openings in portions of the surface of the laser-processing stage where objects are arranged by a suction unit provided on the back of the laser-processing stage.

Objects arranged on the laser-processing stage are suctioned by the suction unit as a result of gas on the surface of the laser-processing stage being suctioned by the suction unit on the back of the laser-processing stage. Consequently, contact between the objects and laser-processing stage is increased, and the objects are fixed over the openings in the laser-processing stage. Thus, laser light can be radiated at a target irradiated location more accurately, thereby enabling laser processing to be carried out more efficiently.

Furthermore, the laser processing method according to the present invention can also be described in the form of an invention of a laser processing device as indicated below. These are substantially the same inventions, only differing in category, and demonstrate similar action and effects.

Namely, the laser processing device according to the present invention has a laser light source for radiating laser light, a flat laser-processing stage on which a plurality of objects are arranged in an array, radiation optics for scanning laser light emitted from the laser light source over the objects arranged on the laser-processing stage and over irradiated locations in the periphery thereof while radiating laser light from a direction perpendicular to the installation surface, and reflecting members which are provided on the laser-processing stage adjacent to each of the plurality of objects and which irradiate lateral surfaces of the objects by reflecting laser light radiated from the radiation optics.

In a preferable aspect of the laser processing device according to the present invention, the surface of the laser-processing stage excluding the reflecting members is preferably composed of a material having low reflectance with respect to laser light. In addition, an aspect may also be adopted in which the surface of the laser-processing stage excluding the reflecting members is composed of a substance that absorbs laser light or is permeable thereto.

The laser processing device according to the present invention can also adopt an aspect in which the height of the reflecting members is the same as the lateral surfaces of the objects, and laser light is irradiated onto lateral surfaces of the objects from a direction parallel to the laser-processing stage by reflecting the laser light.

In addition, an aspect can also be adopted in which a height adjustment unit is provided for changing the height of the reflecting members.

The laser processing device according to the present invention can also adopt an aspect in which changing the height of the reflecting members is carried out after the height adjustment unit has received a control signal emitted by an object inverting unit when inverting the objects following completion of processing of one side of the objects but prior to the start of processing of the other side of the objects by inverting the objects with the object inverting unit.

In addition, the laser processing device according to the present invention can also adopt an aspect in which a suction unit is provided on the back of the laser-processing stage for suctioning air on the surface of the laser-processing stage through openings provided in the surface of the laser-processing stage where the objects are arranged.

Moreover, the cable harness production method according to the present invention enables shielding wires respectively covering the surfaces of coaxial cables contained in a cable harness to be collectively removed. Namely, this production method comprises preparing a laser-processing stage having an installation surface and a plurality of reflecting members arranged at fixed intervals along a predetermined direction on the installation surface and respectively having reflecting surfaces inclined relative to the installation surface, arranging a plurality of coaxial cables on the installation surface of the laser-processing stage so that they are respectively positioned between adjacent reflecting members among the plurality of reflecting members, and irradiating alternately one of the coaxial cables and one of the reflecting members by scanning along the predetermined direction with laser light radiated onto the installation surface of the laser-processing stage from a direction perpendicular to the installation surface.

At this time, laser light that has reached one of the reflecting members is reflected by the reflecting surface of the reflecting member reached by the laser light, and one lateral surface of the coaxial cable among the plurality of coaxial cables that is adjacent to the reflecting member reached by the laser light is irradiated.

BRIEF DESCRIPTION OF THE DRAWINGS

FIG. 3A is a drawing for explaining a light path traveled by laser light that reaches reflecting members in a first embodiment, while

DESCRIPTION OF THE PREFERRED EMBODIMENTS

In the following, embodiments of the laser processing method and laser processing device according to the present invention with reference to FIGS. 1 and 2, 3A and 3B and 4 to 8. In the description of the drawings, identical or corresponding components are designated by the same reference numerals, and overlapping description is omitted.

(First Embodiment)

Figure 1:
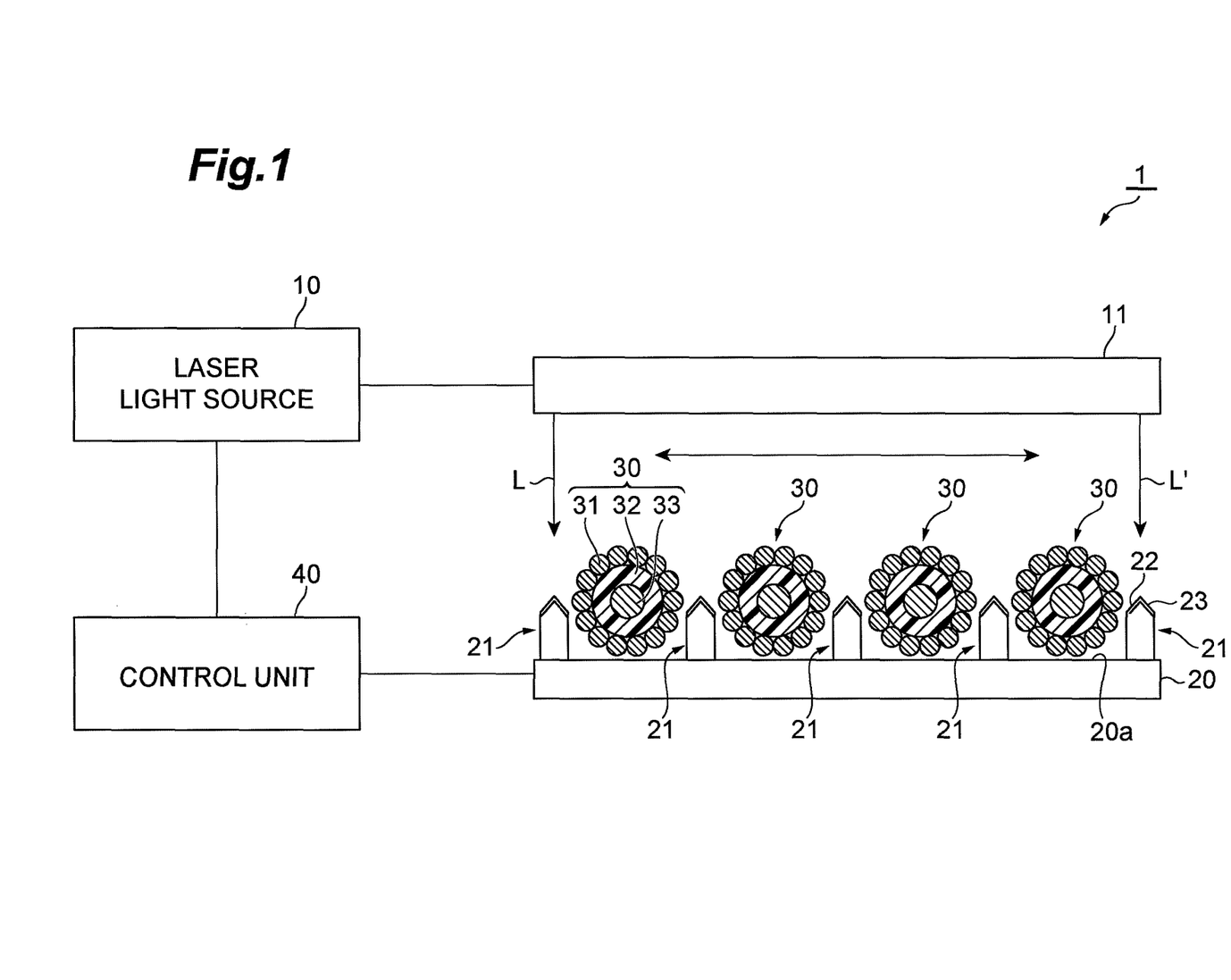
FIG. 1 is a drawing showing the configuration of a first embodiment of a laser processing device according to the present invention.

The following provides an explanation of a first embodiment of the laser processing device according to the present invention. FIG. 1 is a drawing showing the configuration of a laser processing device 1 according to the present embodiment. The laser processing device 1 shown in FIG. 1 is provided with a laser light source 10, radiation optics 11, a laser-processing stage 20, reflecting members 21 and a control unit 40, and processes objects 30 arranged on the laser-processing stage 20. A height adjustment unit, for adjusting the height of the reflecting surfaces 22 and 23 of the reflecting members 21 from the installation surface 20a of the laser-processing stage 20, is constituted by the laser-processing stage 20 and the control unit 40. The laser processing device 1 further comprises an object inverting unit 60 for changing the surfaces of objects that directly face the radiation optics 11.

The laser light source 10 outputs laser light, and is a YAG laser light source or an optic fiber laser light source comprised of optical amplification media in the form of optic fibers in which a Yb element has been added to an optical waveguide region.

The radiation optics 11 inputs light output from the laser light source 10, and outputs that laser light towards the objects 30 arranged on the laser-processing stage 20. The radiation optics 11 is able to scan the objects 30 and the periphery thereof. More specifically, the radiation optics 11 is composed of a scanning unit such as a galvano scanner, and causes the location where laser light is radiated to move parallel to the laser-processing stage 20 on which the objects 30 are arranged. As a result, laser light output from the radiation optics 11 is able to move between an irradiated location L and an irradiated location L'.

The laser-processing stage 20 is a stage on which the objects 30 are placed. The surface of the laser-processing stage 20, excluding the areas where the reflecting members 21 are positioned, preferably has low reflectance with respect to laser light. In addition, it is also preferably a substance that absorbs laser light or is permeable thereto. Preferable examples of substances that absorb laser light or are permeable thereto on the surface of the laser-processing stage 20 include zirconia and black alumite. As a result of having low reflectance with respect to laser light, laser light reflected on the surface of the laser-processing stage 20 is inhibited from entering the radiation optics 11.

The reflecting members 21 are provided on the laser-processing stage 20. As shown in FIG. 1, the reflecting members 21 are arranged between a plurality of objects 30 arranged on the laser-processing stage 20. These reflecting members 21 are provided with a height adjustment unit that has a function for changing the height of the reflecting members. The upper portions of the reflecting members 21 are composed of two inclined surfaces (reflecting surfaces) 22 and 23. The inclined surfaces 22 and 23 are shaped to as to be inclined towards the sidewalls of the reflecting members 21. In addition, the surfaces of these inclined surfaces 22 and 23 are preferable composed of a material having high reflectance with respect to laser light, and are preferably in the form of a gold, ZnSe, aluminum, copper or dielectric multilayer film and the like.

The control unit 40 is connected to the laser light source 10, the laser-processing stage 20 and the reflecting members 21, and in addition to receiving signals from the laser light source 10 and controlling the laser-processing stage 20 and the reflecting members 21 based on those signals, receives signals from the laser-processing stage 20 and the reflecting members 21 and controls emission of laser light from the laser light source 10 based on those signals.

In this manner, in the laser processing device 1 according to the present embodiment, laser light output from the laser light source 10 is radiated towards the objects 30 arranged on the laser-processing stage 20 by the radiation optics 11.

The objects 30 are arranged in a state of a plurality thereof being arranged in a row in the form an array on the laser-processing stage 20 as shown in FIG. 1. In the present embodiment, coaxial cables composed of a central conductor 33, an internal insulator 32 and shielding wires 31, in order moving outward from the center thereof, are processed as the objects 30.

Figure 2:
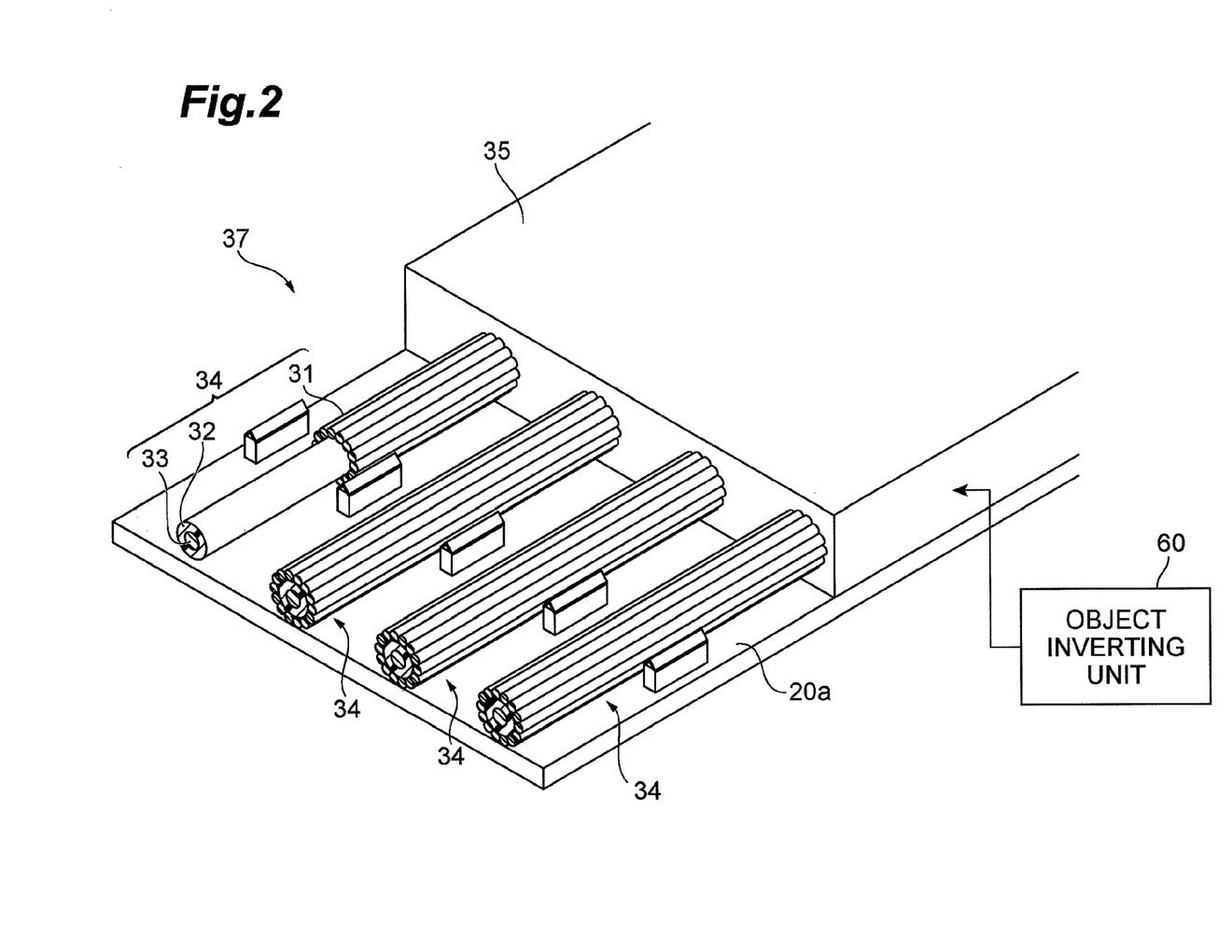
FIG. 2 is a drawing showing an example of an object.

The following provides an explanation of objects able to be preferably processed using the laser processing device 1 of the present embodiment with reference to FIG. 2. FIG. 2 is a drawing shown an example of the objects 30. The structure of a cable harness 37 of FIG. 2 consists of a plurality of coaxial cables 34, composed of the central conductor 33, the internal insulator 32 and the shielding wires 31 in order moving outward from the center thereof, arranged in a row and covered with an outer casing 35. As shown in FIG. 2, this type of cable harness undergoes processing consisting of removing the outer casing 35 followed by removing the shielding wires 31 of the coaxial cables 34. The laser processing device 1 according to the present embodiment has for the objects thereof the optical cables 34 arranged in a row as shown in FIG. 2, and is preferable in the case of carrying out processing for removing the shielding wires 31 of the plurality of coaxial cables 34 all at once by irradiating with laser light.

Figure 3A:
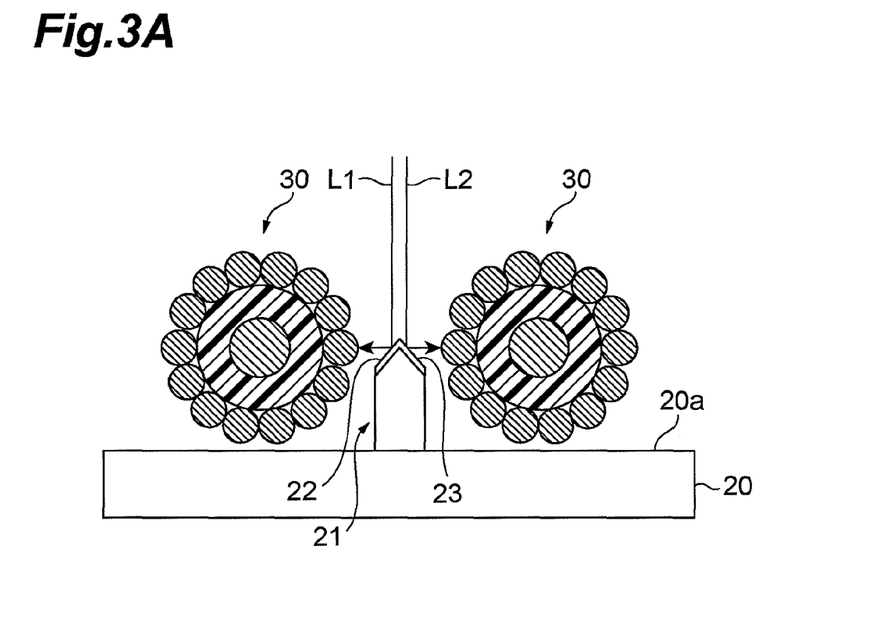

Next, an explanation is provided of the structure and function of the reflecting members 21 with reference to FIG. 3A. FIG. 3A is a drawing for explaining a light path traveled by laser light in the case of irradiating the reflecting members 21 with laser light in the present embodiment. In FIG. 3A, a reflecting member 21 is provided between two of the objects 30 arranged in a row on the laser-processing stage 20. The upper surface of the reflecting member 21 is composed of an inclined surface 22 and an inclined surface 23, and these inclined surfaces are respectively arranged so at be inclined towards a lateral surface of the reflecting member 21. The inclination angles of the inclined surfaces 22 and 23 are 45° each relative to the surface of the laser-processing stage 20, as well as 45° relative to the emitted direction of laser light radiated from a direction perpendicular to the laser-processing stage 20. In the case laser light output from the radiation optics 11 has reached the reflecting member 21, it radiates the inclined surface 22 of the inclined surface 23.

First, laser light L1 that has reached the inclined surface 22 is reflected by the inclined surface 22. Since the inclined surface 22 is provided at a location so as to be at a 45° angle to the light path of the laser light L1 and to the surface of the laser-processing stage 20, the laser light L1 reflected by the inclined surface 22 is output in a direction parallel to the laser-processing stage 20. The laser light L1 for which the output direction thereof has been changed in this manner is radiated onto a lateral surface of the object 30 arranged adjacent to the reflecting member 21. Thus, the laser light L1 reflected by the inclined surface 22 of the reflecting member 21 enables laser processing to be carried out on a lateral surface of the object 30.

In addition, the case of laser light having reached the inclined surface 23 is the same as the case of laser light having reached the inclined surface 22. Laser light L2 that has reached the inclined surface 23 is reflected by the inclined surface 23 and output in a direction parallel to the laser-processing stage 20. The laser light L2 for which the output direction thereof has been changed in this manner is radiated onto a lateral surface of the object 30 arranged adjacent to the reflecting member 21. Thus, the lateral surface of the object 30 undergoes laser processing by the laser light L2 reflected by the inclined surface 23 of the reflecting member 21.

In this manner, since laser light is output in a direction parallel to the laser-processing stage 20 and irradiates a lateral surface of the object 30 as a result of laser light having reached the reflecting member 21 being reflected by the inclined surface 22 of the inclined surface 23 of the upper portion of the reflecting member 21, laser processing the lateral surface can be carried out efficiently.

Figure 3B:
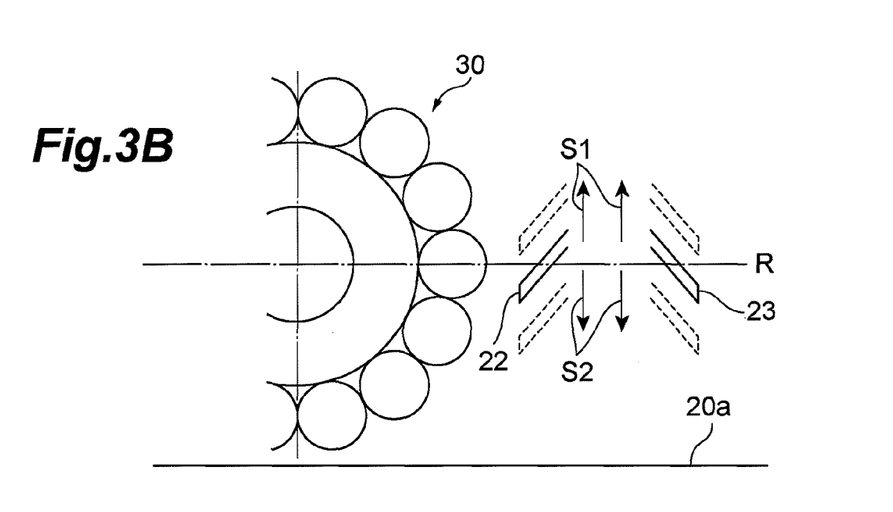
FIG. 3B is a drawing for explaining the positional relationship between an object and inclined surfaces (reflecting surfaces) of a reflecting member.

Furthermore, the positional relationship between the object 30 and the inclined surfaces 22 and 23 of a reflecting member 21 located adjacent thereto is shown in FIG. 3B. Namely, the inclined surfaces 22 and 23 of the reflecting member 21, which function as reflecting surfaces for reflecting light that has reached an area between the objects 30 onto the lateral surfaces of the objects 30, may be provided within a range that intersects with a straight line R passing through the center of the objects and parallel to an installation surface 20a of the laser-processing stage 20. Thus, as shown in FIG. 3B, the inclined surfaces 22 and 23 can be moved in a direction indicated by arrows S1 or S2 within a range within which they are able to intersect the straight line R. The height adjustment for the reflecting members 21 is performed by the control unit 40.

Figure 4:
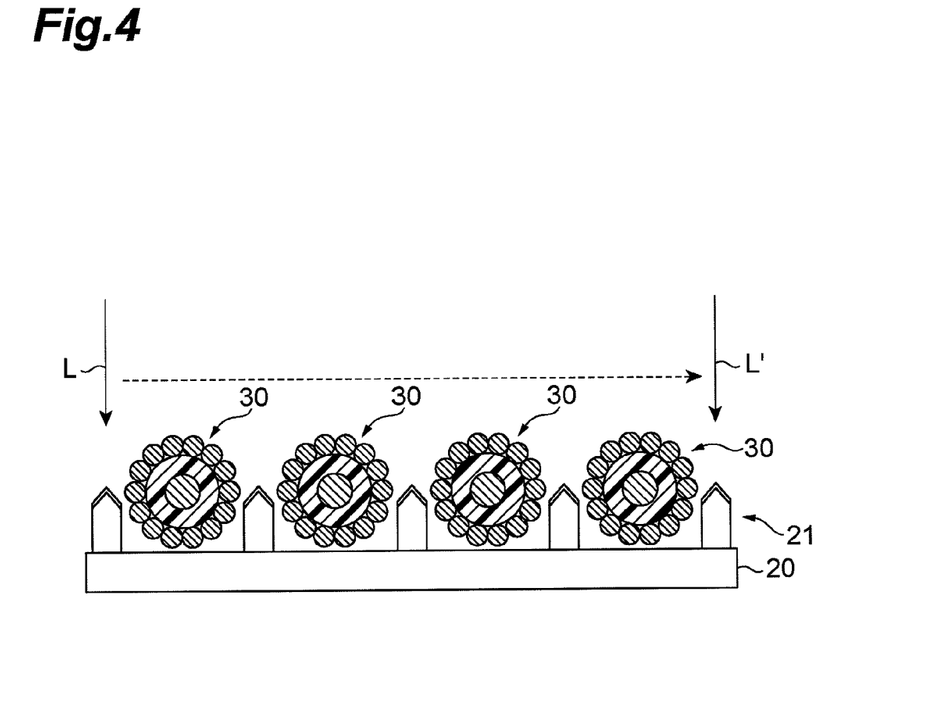
FIG. 4 is a drawing showing the procedure of a method of laser-processing on objects using the laser processing device according to a first embodiment.
Figure 5:
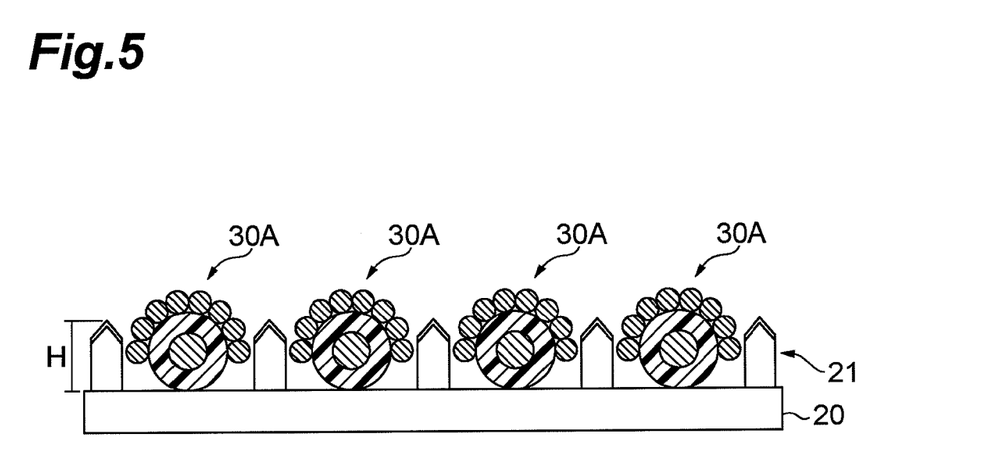
FIG. 5 is a drawing showing the procedure of a method of laser-processing on objects using the laser processing device according to the first embodiment.
Figure 6:
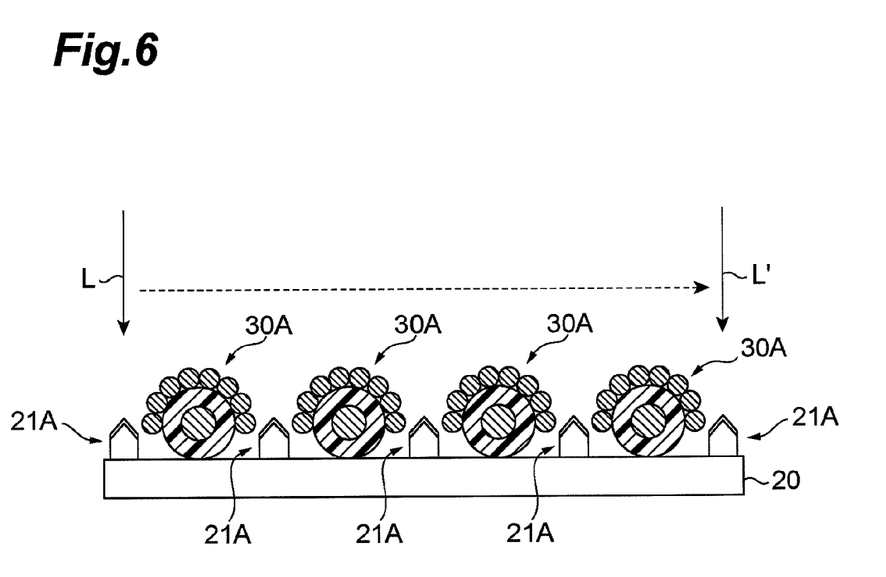
FIG. 6 is a drawing showing the procedure of a method of laser-processing on objects using the laser processing device according to the first embodiment.
Figure 7:
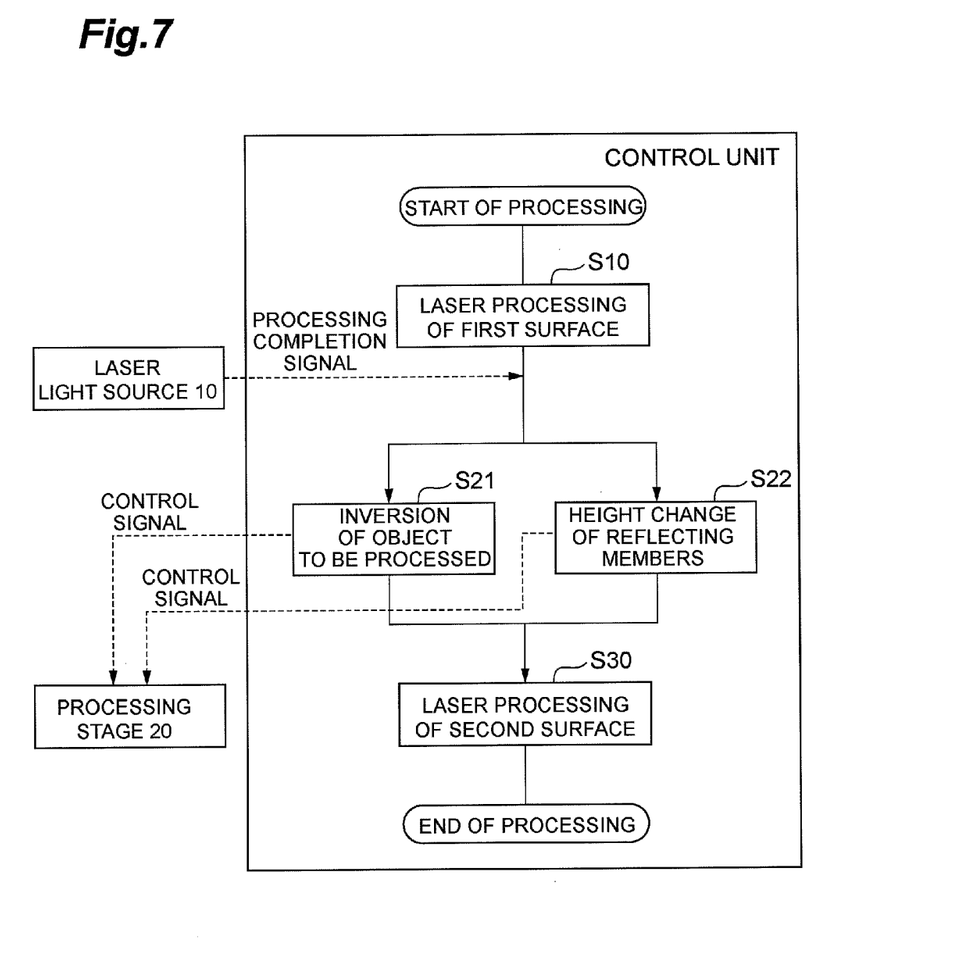
FIG. 7 is a flow chart showing the procedure of a method of laser-processing on objects using the laser processing device according to the first embodiment.

Next, an explanation is provided of the detailed procedure in the case of carrying out laser processing on the objects 30 using the laser processing device 1 of the present invention with reference to FIGS. 4 to 7. FIGS. 4 to 6 are drawings showing a procedure of a method of laser-processing on the objects 30 using the laser processing device 1 according to the present embodiment. In addition, FIG. 7 is a flow chart showing the procedure of the above-mentioned laser processing method. Since the series of steps comprising the laser processing method are controlled by the control unit 40, FIG. 7 shows the laser processing method in the form of a control sequence controlled by the control unit 40.

First, in step S10, the control unit 40 instructs the laser light source 10 to begin radiating laser light and carry out laser processing on a first surface. This first surface refers to one of the surfaces of the objects 30, is a surface on the side facing the radiation optics 11 when the objects 30 are arranged on the laser-processing stage 20. In accordance with the instruction of the control unit 40, laser light is radiated onto the laser-processing stage 20 on which the objects 30 are arranged as shown in FIG. 4 to carry out laser processing of the first surface. Laser light output from the laser light source 10 radiates from an irradiated location L to an irradiated location L' as a result of the irradiated locations being scanned by the radiation optics 11. Laser light radiated by the radiation optics 11 that has reached the objects 30 processes the surfaces of the objects 30. On the other hand, laser light that has reached the reflecting members 21 is reflected by the upper portions of the reflecting members 21 as previously described and processes the lateral surfaces of the objects 30. When laser processing of the first surface has been completed, the laser light source 10 transmits a processing completion signal to the control unit 40.

Upon receiving this processing completion signal, the control unit 40 emits a control signal towards the laser-processing stage 20 instructing an inversion of the objects as shown in step S21. In coordination therewith, a control signal instructing a height change of the reflecting members is emitted towards the reflecting members 21 as shown in step S22.

At the laser-processing stage 20, the object inverting unit 60 (FIG. 2) inverts the objects in step S21. More specifically, the objects 30A on which processing of the first surface has been completed are inverted as shown in FIG. 5. As a result of inverting the objects 30A, a second surface (other surface of the objects 30 having an unprocessed portion) is able to undergo laser processing. On the other hand, the height of the reflecting members 21 is changed in step S22. More specifically, height H of the reflecting members 21 on the laser-processing stage 20 is changed by a height adjustment unit provided on the reflecting members 21. Since processing has already been completed on the first surface, the height of the objects 30A is lower by the diameter of the shielding wires on the one side as compared with prior to processing. Consequently, the height H of the reflecting members 21 is changed so that laser light reflected by the upper portions of the reflecting members reaches the lateral surfaces of the objects 30A arranged so that the second surface is now the upper surface as a result of inverting. The inverting positional change of the objects and the height change of the reflecting members can also be carried out simultaneously.

Following completion of the positional change of the objects and the height change of the reflecting members, the control unit 40 instructs the laser light source 10 to begin radiating laser light to carry out laser processing on the second surface of the objects as shown in step S30. In accordance with the instruction of the control unit 40, laser light is radiated onto the laser-processing stage 20 on which the objects 30A are arranged as shown in FIG. 6 to carry out laser processing of the second surface. Laser light output from the laser light source 10 radiates from an irradiated location L to an irradiated location L' as a result of the irradiated locations being scanned by the radiation optics 11. Laser light radiated by the radiation optics 11 that has reached the objects 30A processes the surfaces of the objects 30A. On the other hand, laser light that has reached the reflecting members 21 following a change in the height thereof is reflected by the upper portions of the reflecting members 21 as previously described and processes the lateral surfaces of the objects 30A.

As a result of the procedure described above, all of the shielding wires around the objects 30 can be removed and processing is completed.

In accordance with the laser processing device 1 and laser processing method of the first embodiment, since the lateral surfaces of the objects 30 can be processed by reflecting laser light radiated onto the inclined surface 22 or the inclined surface 23 of the upper portions of the reflecting members 21 and outputting that reflected laser light in a direction parallel to the laser-processing stage 20, the lateral surfaces of the objects 30, which are not easily reached by the laser light, can also be processed efficiently. In addition, since the intensity of the laser light is not increased when processing the lateral surfaces, processing can be carried out without causing damage to the upper surfaces of the objects 30 where laser light reaches easily.

(Second Embodiment)

Figure 8:
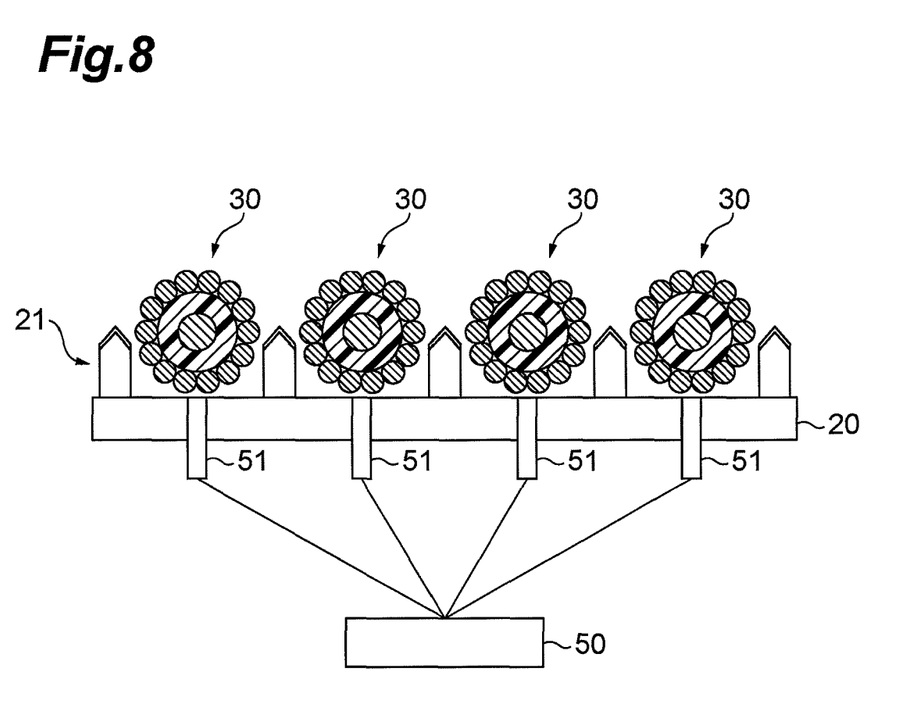
FIG. 8 is a drawing showing the configuration of a laser-processing stage, reflecting members, a pump and suction tubes as essential portions of a second embodiment of the laser processing device according to the present invention.

The following provides an explanation of a second embodiment of the laser processing device according to the present invention. FIG. 8 is a drawing showing the configuration of the laser-processing stage 20, the reflecting members 21, a pump 50 and suction tubes 51 in the laser processing device according to the present embodiment. The laser light source 10, the radiation optics 11 and the control unit 40 are the same as in the first embodiment. A suction unit is constituted by the pump 50 and the suction tubes 51. The laser processing device 2 according to the second embodiment differs from the laser processing device 1 according to the first embodiment with respect to the suction tubes 51 being arranged by providing openings in the laser-processing stage 20, and air on the laser-processing stage 20 being suctioned through the suction tubes 51 using the pump 50.

In the laser processing device 2 according to the second embodiment, the suction tubes 51 are provided below the objects 30 arranged on the laser-processing stage 20. As a result of providing the suction tubes 51 below the objects 30 and suctioning with the pump 50, the objects 30 are suctioned onto the suction tubes 51 thereby enhancing contact of the objects 30 to the laser-processing stage 20 and enabling them to be fixed thereto. As a result of adjusting the height of the reflecting members 21 in the state in which the objects 30 are fixed in this manner, laser light reflected by the inclined surface 22 and the inclined surface 23 of the upper portion of the reflecting members 21 can be suitably radiated onto the lateral surfaces of the objects 30, thereby enabling shielding wires on the lateral surfaces to be removed efficiently.

Although the above descriptions have indicated preferred embodiments of the present invention in detail, the present invention is not limited thereto, but rather can be modified in various ways.

For example, a structure can also be employed in which the laser-processing stage 20 and the reflecting members 21 are integrated into a single unit. Moving the integrated laser-processing stage 20 and reflecting members 21 up and down (direction of radiation of laser light) makes it possible to adjust the height of the reflecting members 21.

In addition, in the first embodiment, laser processing of the second surface (step S30) is carried out using reflecting members 21 in the same manner as during processing of the first surface. However, in the case the lateral surfaces of the objects 30 have been adequately processed as a result of laser processing of the first surface (step S10), when processing the second surface, the second surface may undergo laser processing without using the laser-processing stage 20 by moving the reflecting members 21 and laser-processing stage 20.

In accordance with the present invention, a laser processing method and laser processing device are provided that enable processing of locations not easily reached by laser light to be carried out preferably while at the same time carrying out laser processing without causing damage to locations easily reached by laser light.

What is claimed is:

1. A laser processing device, comprising:
a laser light source for radiating laser light;
a laser-processing stage having an installation surface on which a plurality of objects are arranged;
a plurality of reflecting members arranged at fixed intervals along a predetermined direction on the installation surface of the laser-processing stage such that the plurality of objects are separated from each other in a laser scanning direction, the plurality of reflecting members respectively having reflecting surfaces inclined relative to the installation surface; and
radiation optics for scanning with the laser light emitted from the laser light source over the objects arranged on the laser-processing stage and over irradiated locations in the periphery thereof while radiating the laser light from a direction perpendicular to the installation surface,
wherein each of the plurality of reflecting members adjacent to objects positioned at both sides thereof is positioned on the installation surface of the laser-processing stage such that the reflecting surfaces thereof reflect the laser light toward the adjacent objects positioned at both sides thereof when the laser light is irradiated from the direction perpendicular to the installation surface, and
wherein laser light that has reached one of the reflecting members is reflected by the reflecting surface of the reflecting member reached by the laser light, and one lateral surface of the object among the plurality of objects that is adjacent to the reflecting member reached by the laser light is irradiated.

2. A laser processing device according to claim 1, wherein the installation surface of the laser-processing stage excluding the reflecting members is comprised of a material having low reflectance with respect to the laser light.

3. A laser processing device according to claim 1, wherein the installation surface of the laser-processing stage excluding the reflecting members is comprised of a substance that absorbs laser light or is permeable to the laser light.

4. A laser processing device according to claim 1, wherein the reflecting surfaces of the reflecting members are arranged at locations intersecting with a straight line that passes through the center of each of the plurality of objects and is parallel to the installation surface of the laser-processing stage.

5. A laser processing device according to claim 1, further comprising a height adjustment unit for changing the height of the reflecting surfaces of the reflecting members from the installation surface of the laser-processing stage.

6. A laser processing device according to claim 5, comprising an object inverting unit for inverting the objects, wherein following completion of processing of one surface of the object, and prior to the start of processing of the opposite surface of the object by inverting the object by the object inverting unit, a control signal emitted during inversion of the objects by the object inverting unit is received by the height adjustment unit and the height of the reflecting members is changed.

7. A laser processing device according to claim 1, further comprising a suction unit provided on the back of the laser-processing stage for suctioning a gas on the surface of the laser-processing stage through openings provided in portions of the top surface of the laser-processing stage where the objects are arranged.

* * * * *